US011283756B2

United States Patent
Salkintzis

(10) Patent No.: US 11,283,756 B2
(45) Date of Patent: *Mar. 22, 2022

(54) EPDG SELECTION

(71) Applicant: Motorola Mobility LLC, Chicago, IL (US)

(72) Inventor: Apostolis Salkintzis, Athens (GR)

(73) Assignee: Motorola Mobility LLC, Chicago, IL (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/813,297

(22) Filed: Mar. 9, 2020

(65) Prior Publication Data

US 2020/0213267 A1 Jul. 2, 2020

Related U.S. Application Data

(63) Continuation of application No. 15/194,654, filed on Jun. 28, 2016, now Pat. No. 10,587,568.

(51) Int. Cl.
*H04L 29/12* (2006.01)
*H04L 61/4511* (2022.01)
(Continued)

(52) U.S. Cl.
CPC ...... *H04L 61/1511* (2013.01); *H04L 61/1541* (2013.01); *H04L 61/305* (2013.01);
(Continued)

(58) Field of Classification Search
USPC .......................................................... 370/338
See application file for complete search history.

(56) References Cited

U.S. PATENT DOCUMENTS

2011/0261787 A1* 10/2011 Bachmann .......... H04W 12/037
370/331
2013/0114463 A1 5/2013 Li
(Continued)

FOREIGN PATENT DOCUMENTS

EP 2166724 A1 3/2010
WO 2012/168146 A1 12/2012

OTHER PUBLICATIONS

Alcatel-Lucent, "Discussion on ePDG Selection in Support of Lawful Interception", 3GPP TSG CT WG1 Meeting #95 C1-154346, Nov. 16-20, 2015, pp. 1-4.
(Continued)

*Primary Examiner* — Gregory B Sefcheck
*Assistant Examiner* — Majid Esmaeilian
(74) *Attorney, Agent, or Firm* — Kunzler Bean & Adamson

(57) ABSTRACT

Apparatuses, methods, and systems are disclosed for gateway selection. One apparatus identifies a country in which the apparatus is currently located and transmits a query to a DNS server if the apparatus not being located in a home country, the query identifying the country in which the apparatus is currently located and receives a query response from the DNS server. The apparatus determines that gateway selection is mandated in the country if it receives a query response containing one or more records and selects a first gateway in a VPLMN indicated by the one or more records, each record indicating a VPLMN in the country. The apparatus determines that gateway selection is not mandated in the country if the query response contains no records and selects a second gateway, the second gateway selected in a VPLMN indicated in stored gateway selection information.

20 Claims, 9 Drawing Sheets

(51) Int. Cl.
*H04W 48/20* (2009.01)
*H04W 48/18* (2009.01)
*H04W 48/16* (2009.01)
*H04L 61/4541* (2022.01)
*H04L 101/35* (2022.01)
*H04W 84/12* (2009.01)
*H04W 88/16* (2009.01)

(52) U.S. Cl.
CPC ........... *H04W 48/16* (2013.01); *H04W 48/18* (2013.01); *H04W 48/20* (2013.01); *H04W 84/12* (2013.01); *H04W 88/16* (2013.01)

(56) References Cited

U.S. PATENT DOCUMENTS

| | | | |
|---|---|---|---|
| 2014/0241333 A1* | 8/2014 | Kim | H04W 48/16 370/338 |
| 2016/0037328 A1 | 2/2016 | Raveendran | |
| 2016/0295386 A1 | 10/2016 | Faccin et al. | |
| 2016/0337310 A1 | 11/2016 | Faccin et al. | |
| 2017/0332416 A1* | 11/2017 | Kiss | H04L 61/304 |
| 2018/0139692 A1 | 5/2018 | Liu et al. | |

OTHER PUBLICATIONS

Qualcomm Incorporated, "Revision of ePDG Selection Procedures", http://www.3app.org/Change-Requests, SA WG2 Meeting #109 S2-151674, May 25-29, 2015, pp. 1-3.
PCT/US2017/039730, Notification of Transmittal of the International Search Report and the Written Opinion of the International Searching Authority, or the Declaration, dated Nov. 6, 2017, pp. 1-18.

* cited by examiner

EPDG SELECTION

CROSS-REFERENCE TO RELATED APPLICATIONS

This application claims priority to U.S. patent application Ser. No. 15/194,654 entitled "EPDG Selection" and filed on Jun. 28, 2016 for Apostolis K. Salkintzis, which application is incorporated herein by reference.

FIELD

The subject matter disclosed herein relates generally to wireless communications and more particularly relates to user equipment selection of an enhanced packet data gateway.

BACKGROUND

The following abbreviations are herewith defined, at least some of which are referred to within the following description: Third Generation Partnership Project ("3GPP").

Access Point ("AP"), Access Point Name ("APN"), Downlink ("DL"), Domain Name System ("DNS"), Evolved Node B ("eNB"), Evolved Packet Core ("EPC"), Enhanced Packet Data Gateway ("ePDG"), European Telecommunications Standards Institute ("ETSI"), Fully Qualified Domain Name ("FQDN"), Home Public Land Mobile Network ("HPLMN"), Internet Protocol ("IP"), Internet Protocol Security ("IPsec"), Local Area Network ("LAN"), Long Term Evolution ("LTE"), Mobile Country Code ("MCC"), Mobile Network Code ("MNC"), Orthogonal Frequency Division Multiplexing ("OFDM"), Packet Data Network ("PDN"), Packet Data Network Gateway ("PGW"), Public Land Mobile Network ("PLMN"), Pointer ("PTR"), Radio Access Network ("RAN"), Single Carrier Frequency Division Multiple Access ("SC-FDMA"), User Datagram Protocol ("UDP"), User Entity/Equipment (Mobile Terminal) ("UE"), Uplink ("UL"), Visited Public Land Mobile Network ("VPLMN"), Wide Area Network ("WAN"), and Worldwide Interoperability for Microwave Access ("WiMAX").

In wireless communications networks, user equipment ("UE") are often capable of communicating with a public land mobile network ("PLMN") both over a cellular radio access network that utilizes licensed spectrum and a wireless local area network ("WLAN") that utilizes unlicensed spectrum. Further, the WLAN may not be directly connected to the PLMN, rather the WLAN may communicate with the PLMN via the Internet or other data network. In certain circumstances, a UE may desire to connect to a packet core network of the PLMN to access walled-garden services offered by the PLMN operator (e.g., carrier or mobile operator). In order to connect to the packet core network via the WLAN, the UE establishes a "PDN connection" with a network element in the packet core known as an enhanced packet data gateway ("ePDG").

Each time the UE wants to establish a PDN connection via WLAN (e.g., to access walled-garden services offered by the mobile operator), the UE must select a PLMN and then discover the IP address of an ePDG in the selected PLMN. After discovering the IP address of the ePDG, the UE establishes a secure Internet Protocol Security ("IPsec") tunnel with the ePDG and provides an access point name ("APN") to the ePDG. This APN is used by the ePDG to select and connect with a packet data network ("PDN") gateway ("PGW") which provides access to services that corresponds to the APN.

When the UE is roaming (e.g., located in a visited region) and wants to establish the PDN connection via WLAN, the UE may select an ePDG either in the HPLMN or in a VPLMN. However, in some regions there are mandatory requirements for all PLMNs in that region to support a Lawful Interception. Lawful Interception provides the ability to intercept data traffic of one or more UEs and forward the intercepted data traffic to law enforcement agencies. To comply with Lawful Interception requirements (or other mandatory requirements) for a particular region, a UE located in that region must access services via a PLMN located in that region.

BRIEF SUMMARY

Apparatuses for gateway selection are disclosed. Methods and systems also perform the functions of the apparatus.

In one embodiment, an apparatus for gateway selection includes a transceiver that communicates with a mobile communication network over a wireless local area network ("WLAN"), a storage device having gateway selection information stored therein, and a processor that identifies a country in which the apparatus is currently located. Via the transceiver, the processor transmits a query to a domain name system ("DNS") server in response to the apparatus not being located in a home country, the query identifying the country in which the apparatus is currently located and receives a query response from the DNS server. The processor determines that gateway selection is mandated in the country in response to receiving a query response containing one or more records and selects a first gateway in a visited public land mobile network ("VPLMN") indicated by the one or more records, in response to determining that gateway selection is mandated in the country, each record indicating a VPLMN in the country. The processor determines that gateway selection is not mandated in the country responsive to the query response containing no records and selects a second gateway in response to determining that gateway selection is not mandated in the country, the second gateway selected in a VPLMN included in the gateway selection information.

In one embodiment, a method for gateway selection includes storing gateway selection information and identifying a country in which a user equipment device ("UE") is currently located. The method includes transmitting a query to a domain name system ("DNS") server in response to the UE not being located in a home country, the query identifying the country in which the UE is currently located and receiving a query response from the DNS server. The method includes determining that gateway selection is mandated in the country in response to receiving a query response containing one or more records and selecting a first gateway in a visited public land mobile network ("VPLMN") indicated by the one or more records, in response to determining that gateway selection is mandated in the country, each record indicating a VPLMN in the country. The method includes determining that gateway selection is not mandated in the country responsive to the query response containing no records and selecting a second gateway in response to determining that gateway selection is not mandated in the country, the second gateway selected in a VPLMN included in the gateway selection information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
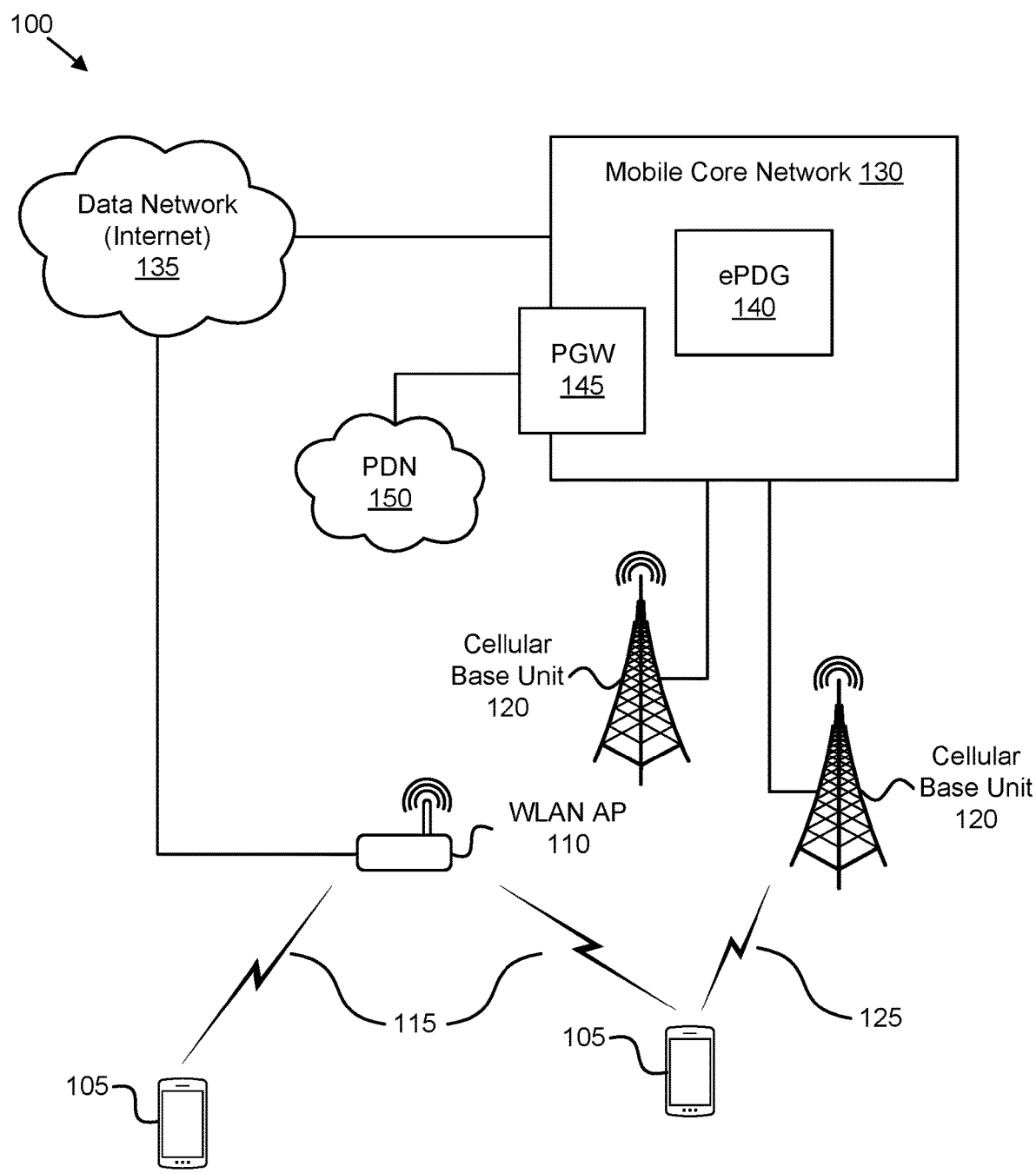
FIG. 1 is a schematic block diagram illustrating one embodiment of a wireless communication system for gateway selection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

To support lawful intercept, a mobile communication network may mandate enhanced packet data gateway ("ePDG") selection for user equipment ("UE") operating in a particular region (e.g., country, state, nation, etc.). The UE determines whether the region (e.g., country) in which it is located in mandates ePDG selection in that region by querying a domain name system ("DNS") server. By using a DNS query, the UE does not need to be registered to a visited public land mobile network ("VPLMN") when roaming in a region in order to determine whether ePDG selection is mandated in that region. Accordingly, a UE with wireless local area network ("WLAN") access in the visited (roaming) region is able to determine whether ePDG selection is mandated in that region without first registering with a VPLMN in the region.

Based on the response to the DNS query request, the UE determines whether it should select an ePDG in a VPLMN or in the home PLMN ("HPLMN"). The DNS server response indicates whether ePDG selection is mandated in the visited region and, if mandated, indicates which public land mobile networks ("PLMNs") in that region deploy ePDGs. If ePDG selection is not mandated in the visited region, then the UE is free to select an ePDG either in a PLMN in the visited region or an ePDG in the HPLMN. Selecting the ePDG may require the UE to send another DNS query to the DNS server in order to discover an IP address of the ePDG, as understood in the art.

FIG. 1 depicts an embodiment of a wireless communication system 100 for gateway selection. In one embodiment, the wireless communication system 100 includes remote units 105, wireless local area network ("WLAN") access points ("APs") 110, WLAN communication links 115, cellular base units 120, and cellular communication links 125. Even though a specific number of remote units 105, WLAN APs 110, WLAN communication links 115, cellular base units 120, and cellular communication links 125 are depicted in FIG. 1, one of skill in the art will recognize that any number of remote units 105, WLAN APs 110, WLAN communication links 115, cellular base units 120, and cellular communication links 125 may be included in the wireless communication system 100.

In one embodiment, the remote units 105 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the WLAN APs 110 via uplink ("UL") and downlink ("DL") communication signals. Furthermore, the UL and DL communication signals may be carried over the WLAN communication links 115. Similarly, the remote units 105 may communicate with one or more cellular base units 120 via UL and DL communication signals carried over the cellular communication links 125.

The WLAN APs 110 may be distributed over a geographic region. As depicted in FIG. 1, each WLAN AP 110 connects to a data network 135, such as the Internet. Typically, the WLAN APs 110 do not have direct access to the mobile core network 130 (such WLAN deployments are referred to as "un-trusted" WLANs). Instead, the WLAN APs 110 rely on the data network 135 to connect to the mobile core network 130. The mobile core network 130 may provide services to a remote unit 105 via WLAN access (e.g., via the WLAN AP 110), as described in greater detail herein.

Each WLAN AP 110 may serve a number of remote units 105 with a serving area. Typically, a serving area of the WLAN AP 110 is smaller than the serving area of a cellular base unit 120. The WLAN APs 110 may communicate directly with one or more remote units 105 by receiving UL communication signals and transmitting DL communication signals to serve the remote units 105 in the time, frequency, and/or spatial domain. Both DL and UL communication signals are carried over the WLAN communication links 115. A WLAN AP 110 may communicate using unlicensed radio spectrum.

The cellular base units 120 may be distributed over a geographic region. In certain embodiments, a cellular base unit 120 may also be referred to as an access terminal, a base, a base station, a Node-B, an eNB, a Home Node-B, a relay node, a device, or by any other terminology used in the art. The cellular base units 120 are generally part of a radio access network ("RAN") that may include one or more controllers communicably coupled to one or more corresponding cellular base units 120. These and other elements of radio access network are not illustrated but are well known generally by those having ordinary skill in the art.

The cellular base units 120 may serve a number of remote units 105 within a serving area, for example, a cell or a cell sector via a wireless communication link. The cellular base units 120 may communicate directly with one or more of the remote units 105 via communication signals. Generally, the cellular base units 120 transmit downlink ("DL") communication signals to serve the remote units 105 in the time, frequency, and/or spatial domain. Furthermore, the DL communication signals may be carried over the cellular communication links 125. The cellular communication links 125 may be any suitable carrier in licensed or unlicensed radio spectrum. The cellular communication links 125 may communicate with one or more of the remote units 105 and/or one or more of the cellular base units 120.

The cellular base units 120 connect to the mobile core network 130 via the RAN. In one embodiment, the mobile core network 130 is a 5G packet core or the evolved packet core ("EPC") specified in LTE specifications, which may be coupled to other networks, like the Internet and private data networks, among other data networks. The present disclosure is not intended to be limited to the implementation of any particular wireless communication system architecture or protocol. Thus, in a non-LTE implementation, the cellular base units 120 may be coupled to a non-EPC type of packet core network, such as to a "5G" packet core network.

Each mobile core network 130 belongs to a single public land mobile network ("PLMN"). The depicted mobile core network 130 includes at least one PDN gateway ("PGW") 145 communicatively coupled to the RAN and at least one PDN 150. The PGW 145 may support lawful interception of telecommunications between the remote unit 105 and the PDN 150. The mobile core network 130 further includes at least one enhanced packet data gateway ("ePDG") 140 for establishing PDN connections between the mobile core network 130 and the remote unit 105 via the WLAN AP 110. Even though a specific number of ePDGs 140 and PGWs 145 are depicted in FIG. 1, one of skill in the art will recognize that any number of ePDGs 140 and PGWs 145 may be included in the mobile core network 130. Further, the wireless communication system 100 may include any number of mobile core networks 130.

In one implementation, the wireless communication system 100 is compliant with the long-term evolution ("LTE") of the 3GPP protocol, wherein the cellular base units 120 transmit using an orthogonal frequency division multiplexing ("OFDM") modulation scheme on the DL and the remote units 105 transmit on the UL using a single-carrier frequency division multiple access ("SC-FDMA") scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

In certain embodiments, a remote unit 105 is provisioned with ePDG selection information by a mobile core network 130, such as the mobile core network 130 of a home PLMN for the remote unit 105. The ePDG selection information may include a prioritized list of PLMNs for use by the remote unit 105 in selecting an ePDG 140. ePDG selection information is discussed in further detail below with reference to FIGS. 2-4 and 7.

Figure 2:
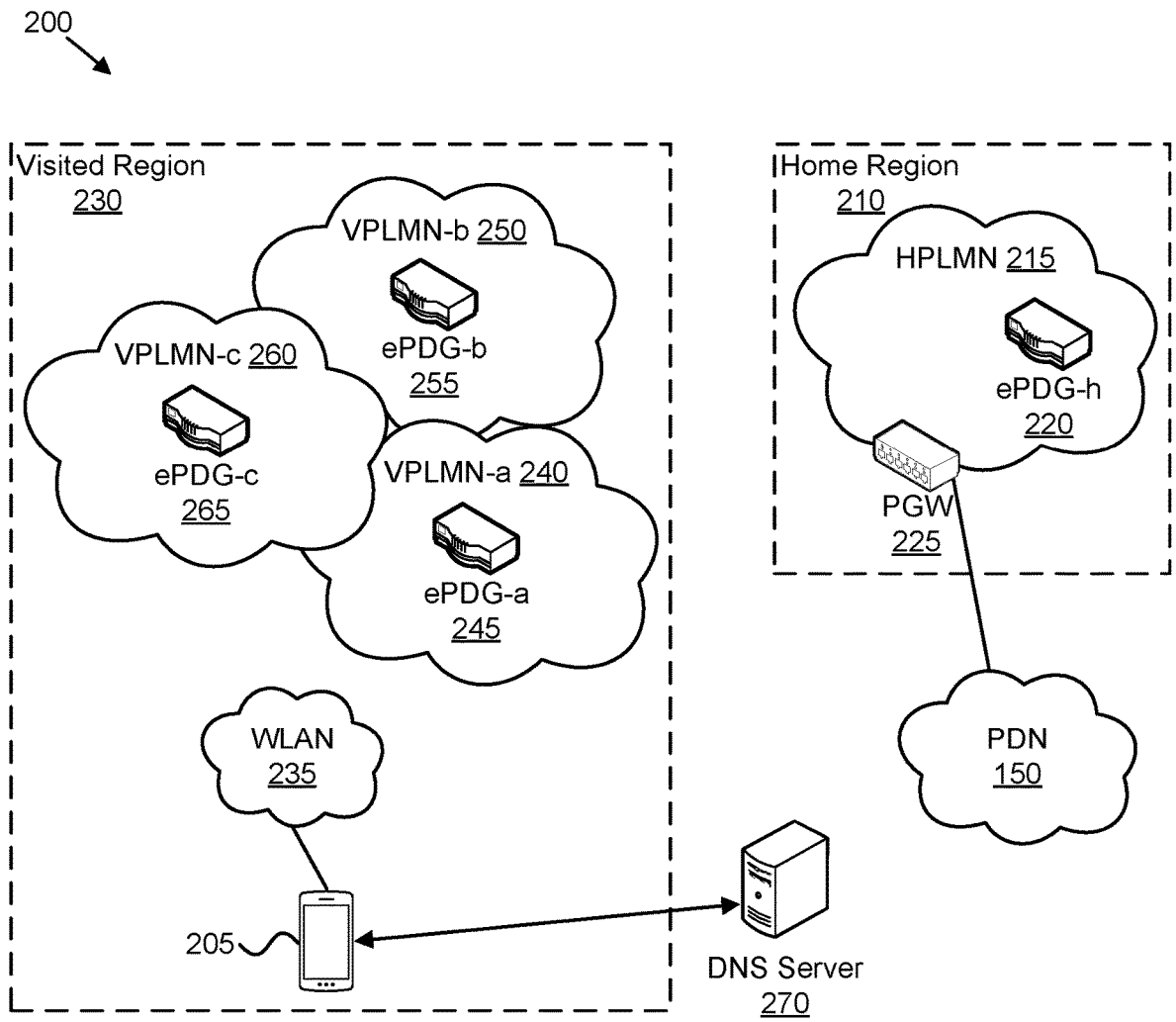
FIG. 2 illustrates one embodiment of network architecture for gateway selection.

FIG. 2 depicts a network architecture 200 for gateway selection, according to embodiments of the disclosure. The network architecture 200 depicts a UE 205 that is connected with a WLAN access network prior to establishing a PDN connection with an ePDG. The UE 205 may be one embodiment of a remote unit 105 discussed above with reference to FIG. 1. The network architecture 200 includes a home region 210 which contains a home PLMN ("HPLMN") 215 of the UE 205. The HPLMN 215 includes at least one ePDG 220 (labeled ePDG-h) and a PGW 225 that controls access to a PDN 150. In the one embodiment, the PDN 150 provides walled-garden services.

The network architecture 200 also includes a visited region 230 containing three visited PLMNs ("VPLMNs"): VPLMN-a 240, VPLMN-b 250, and VPLMN-c 260. The VPLMNs in the visited region 230 each contain an ePDG; specifically, ePDG-a 245, ePDG-b 255, and ePDG-c 265, respectively. In the depicted embodiment, the UE 205 is located within the visited region 230 and is connected to a WLAN 235.

While accessing the WLAN 235, the UE 205 desires to establish a PDN connection over the WLAN 235 in order to access services in the PDN 150. As discussed above, certain regions (e.g., jurisdictions) require support for lawful interception, which affects ePDG selection by the UE 205 when in the visited region 230. Accordingly, the UE 205 must determine whether the visited region 230 mandates ePDG selection in that region in order to support lawful interception. The UE 205 queries a DNS server 270 in order to determine whether the visited region 230 mandates ePDG selection in that region without first having to connect with a VPLMN in the visited region 230.

Figure 3:
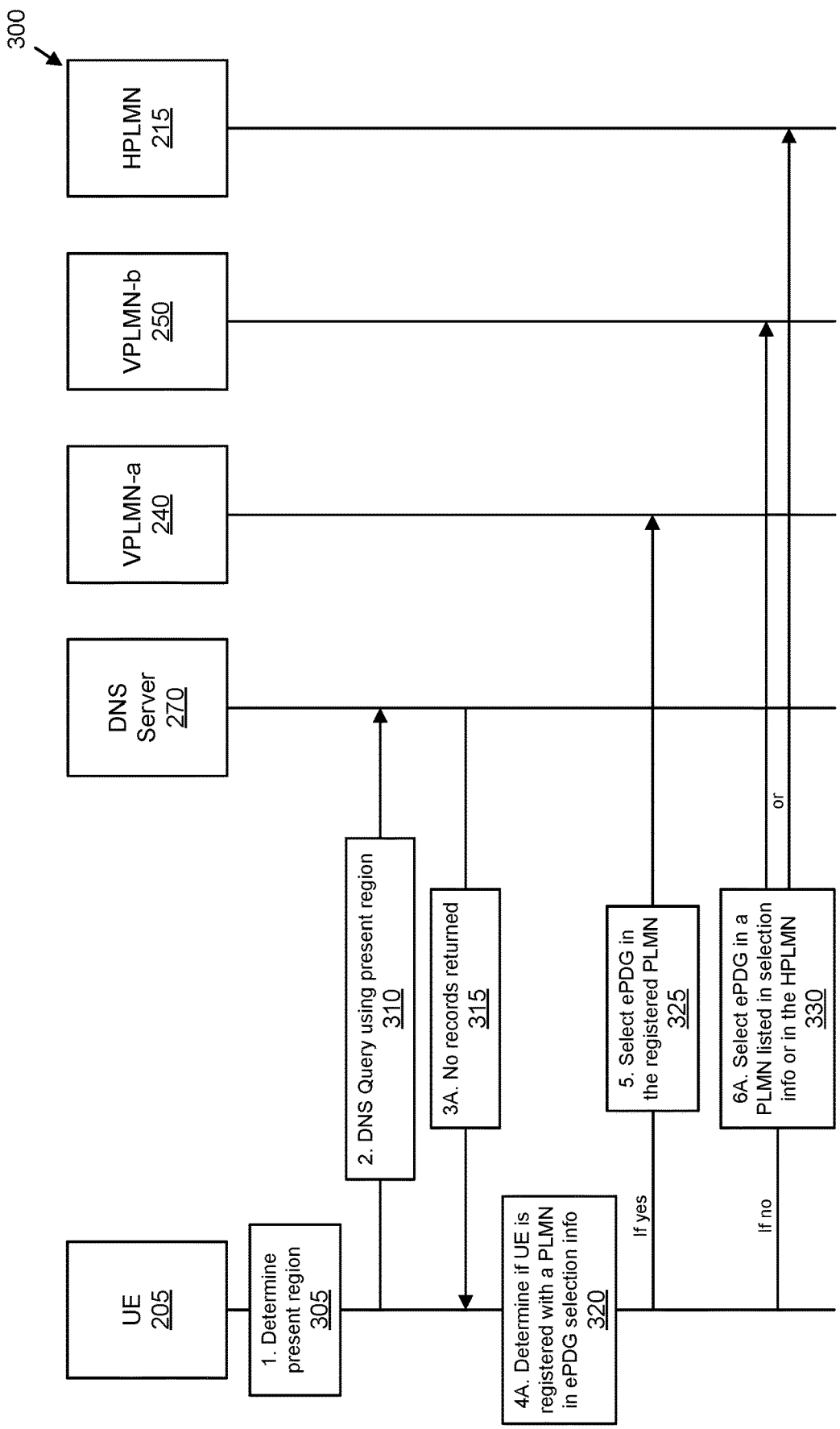
FIG. 3 illustrates one embodiment of a ePDG selection procedure.

FIG. 3 depicts an ePDG selection procedure 300, according to embodiments of the disclosure. The ePDG selection procedure 300 depicts procedures performed by and communications among the UE 205, the DNS server 270, the VPLMN-a 240, and the HPLMN 215. As depicted in FIG. 2, the UE 205 is located in a visited region (e.g., visited region 230) and communicates via WLAN (e.g., WLAN 235). In the ePDG selection procedure 300, it is assumed that the visited region does not mandate ePDG selection in that region.

The UE 205 first determines 305 the region in which it is located, also known as its "present region." The present region may be a present country, a present state, or other present jurisdiction of the UE 205. In one example, the UE 205 determines the region it is located in by receiving the Country IE included in beacon frames of available WLAN APs 110. The hotspot 2.0 (release two) specification requires the Country IE to be transmitted by all HS2.0-compliant access points. In another example, the UE 205 may use a GPS receiver to determine its latitude and longitude coordinates and determine its present region using these coordinates. In yet another example, UE 205 may determine its present region by identifying the mobile country code ("MCC") that is broadcast by cellular base units of available PLMNs.

In certain embodiments, the UE 205 determines 305 the region in which it is located for configuring its WLAN operation. For example, the UE 205 may be required to configure its WLAN interface to operate in compliance with regulations of the present region. Such regulations may include power class, frequency channels, and the like. If the UE 205 determines that it is located in its home region 210, then the UE selects an ePDG in the HPLMN 215 (e.g., selects the ePDG-h 220). However, in the embodiments of FIGS. 2-5, the UE 205 is not located in its home region 210. Instead, the UE 205 is located in the visited region 230.

Because the UE 205 determines that it is located in a region other than its home region, the UE 205 uses DNS-based service discovery to determine if the region in which it is presently located mandates the selection of ePDG in that region. The UE 205 transmits a DNS query 310 identifying the present region. In one embodiment, the present region corresponds to a present country and the UE 205 uses an international organization for standardization ("ISO") country code to identify the present country to the DNS server 270. For example, if the UE 205 is located in France (which has the ISO country code of "FR"), then the UE 205 makes a DNS query 310 that includes the ISO country code "FR."

In some embodiments, the UE 205 addresses the DNS query 310 to a region-specific domain corresponding to the present region of the UE 205. Additionally, the DNS query 310 may use a service discovery label corresponding to ePDG selection inquiries. Specific formats of a DNS query for gateway selection are discussed with reference to FIG. 8A. The UE 205 then determines of the region in which it is located mandates the selection of ePDG in that region based on a response from the DNS server 270.

In the embodiment of FIG. 3, the present region of the UE 205 (e.g., the visited region 230) does not mandate ePDG selection in that region. Therefore, the DNS server 270 returns 315 no records in response to the DNS query 310. In one embodiment, the DNS server 270 returns 315 no records by failing to respond to the DNS query 310 (e.g., by ignoring the DNS query 310). In other embodiments, the DNS server 270 returns 315 no records by transmitting an empty response to the UE 205 (i.e. a response that contains no records). Note that if the DNS query 310 returns 315 no records, this does not mean that there are no PLMNs in the present region that support ePDGs. Rather, returning 315 no records indicates that the local regulation does not mandate the UE 205 to select an ePDG of a PLMN located within the present region.

In certain embodiments, the DNS query 310 is a DNS pointer ("PTR") query. In such embodiments, the DNS server 270 may return one or more PTR records to the UE 205. However, in the embodiment of FIG. 3, the DNS server 270 does not return any PTR records because the local regulations of the visited region 230 does not require the UE 205 to select an ePDG of a PLMN in the visited region 230.

In response to the DNS server 270 returning 315 no records, the UE 205 determines 320 whether it is registered with a PLMN listed in the ePDG selection information of the UE 205. In certain embodiments, the UE 205 may be registered with a PLMN in the visited region 230 (e.g., one of VPLMN-a 240, VPLMN-b 250, and VPLMN-c 260) while accessing the WLAN 235. The VPLMN with which the UE 205 is registered may or may not be included in the ePDG selection information. In response to the UE 205 being registered with a VPLMN listed in the ePDG selection information, the UE 205 selects 325 an ePDG in the VPLMN in which it is already registered (depicted here as VPLMN-a 240). This selection 325 may require another DNS query (as already specified in prior art) in order to discover the IP address of the ePDG in the VPLMN (e.g., an IP address of the ePDG-a 245).

Otherwise, in response to the UE 205 not being registered with a VPLMN listed in the ePDG selection information, the UE 205 selects 330 an ePDG either in a VPLMN listed in the ePDG selection information or in the HPLMN 215. In one embodiment, the UE 205 determines whether any VPLMNs listed in the ePDG selection information are located in the present region (e.g., the visited region 230). If the ePDG selection information lists a VPLMN in the visited region 230, then the UE 205 selects an ePDG in that VPLMN. Where the ePDG selection information lists more than one VPLMN in the present region, then the UE selects an ePDG in the highest priority VPLMN (as indicated by the ePDG selection information) located in the present region. Here, the VPLMN-b 250 is depicted as a highest priority VPLMN located in the present region and listed in the ePDG selection information. Accordingly, the UE 205 selects an ePDG located in the VPLMN-b 250 (e.g., the ePDG-b 255).

If no VPLMNs listed in the ePDG selection information are located in the present region (e.g., the visited region 230), then the UE selects 330 an ePDG in the HPLMN 215 (e.g., selects the ePDG-h 220). Additionally, the UE 205 may select the ePDG-h 220 in the HPLMN 215 in response to being unable to connect with an ePDG in any of the VPLMNs in the visited region 230. Note that the UE 205 is permitted to select an ePDG in the HPLMN 215 because the DNS server 270 did not return any records, thus indicating that the visited region 230 does not mandate ePDG selection in that region.

Again, the selection 330 may require another DNS query (as currently specified in 3GPP TS 23.402) in order to discover the IP address of the ePDG in the HPLMN. As one example, the UE 205 may not be registered via 3GPP access to any PLMN so the UE 205 not being registered with a VPLMN listed in the ePDG selection information. As another example, the UE 205 may be registered with the PLMN that is not listed in the ePDG selection information. In these situations, the UE 205 selects an ePDG in the HPLMN 215 in response to the DNS server 270 returning 315 no records.

Figure 4:
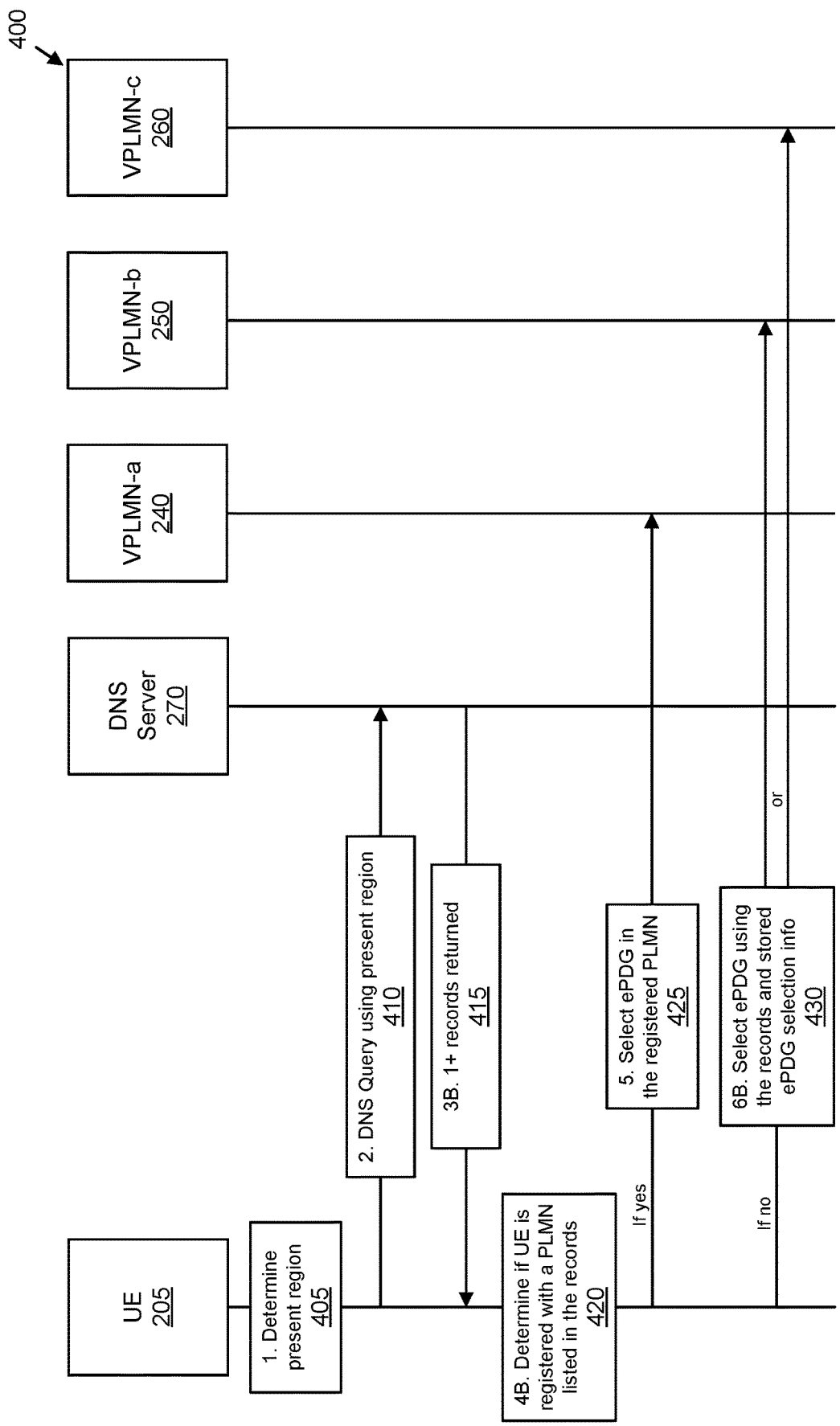
FIG. 4 illustrates another embodiment of a ePDG selection procedure.

FIG. 4 depicts an ePDG selection procedure 400, according to embodiments of the disclosure. The ePDG selection procedure 400 depicts procedures performed by and communications among the UE 205, the DNS server 270, the VPLMN-a 240, and the HPLMN 215. As depicted in FIG. 2, the UE 205 is located in a visited region (e.g., visited region 230) and communicates via WLAN (e.g., WLAN 235). In the ePDG selection procedure 400, it is assumed that the visited region mandates ePDG selection in that region.

The UE 205 first determines 405 the region in which it is located, also known as its "present region." The present region may be a present country, a present state, or other present jurisdiction of the UE 205. As discussed above, the UE 205 may use various techniques to determine 405 it present region. Here, the UE 205 is located in the visited region 230 and thus determines that the present region is not the home region 210.

Next, the UE 205 uses DNS-based service discovery to determine if the region in which it is presently located mandates the selection of ePDG in that region. The UE 205 transmits a DNS query 410 identifying the present region. In one embodiment, the present region corresponds to a present country and the UE 205 uses an ISO country code to identify the present country to the DNS server 270. For example, if the UE 205 is located in Germany (which has the ISO country code of "DE"), then the UE 205 makes a DNS query 410 that includes the ISO country code "DE."

In some embodiments, the UE 205 addresses the DNS query 410 to a region-specific domain corresponding to the present region of the UE 205. For example, if the UE 205 is located in Germany, the UE 205 may address the DNS query 410 to domain isoccDE.pub.3gppnetwork.org. Additionally, the DNS query 410 may use a service discovery label corresponding to ePDG selection inquiries. Specific formats of a DNS query for gateway selection are discussed with reference to FIG. 8A. The UE 205 then determines if the region in which it is located mandates the selection of ePDG in that region based on a response from the DNS server 270.

In the depicted embodiment, the present region of the UE 205 (e.g., the visited region 230) mandates ePDG selection in that region. Therefore, the DNS server 270 returns 415 a list of one or more records in response to the DNS query

410. By receiving 415 one or more records, the UE 205 determines that regulation in the present region mandates ePDG selection in that region. Further, the one or more records identify which PLMNs in the present region deploy ePDGs.

In certain embodiments, the DNS query 410 is a DNS pointer ("PTR") query. In such embodiments, the DNS server 270 may return one or more PTR records to the UE 205. Accordingly, in the embodiment of FIG. 4, the DNS server 270 returns 415 one or more PTR records because the local regulations of the visited region 230 require the UE 205 to select an ePDG of a PLMN in the visited region 230.

In one embodiment, the records returned 415 by the DNS server 270 include a service instance name uniquely identifying a PLMN, such as a MCC/MNC tuple. Each record returned 415 by the DNS server 270 may also include the service discovery label and the region-specific domain included in the DNS query 410 (e.g. isoccDE.pub.3gppnetwork.org). The service discovery label and the region-specific domain in the records returned 415 by the DNS server 270 may be the same as those included in the DNS query 310. Specific formats of records for gateway selection returned in response to a DNS query are discussed with reference to FIG. 8B.

In response to the DNS server 270 returning 415 one or more records, the UE 205 determines that it must select an ePDG in one of the PLMNs located in the present region. The UE 205 also concludes that if it cannot select an ePDG in one of the PLMNs located in the present region, it must terminate the ePDG selection procedure. In addition, the UE 205 determines 420 whether it is registered with a PLMN listed in the records. In response to the UE 205 being registered via 3GPP access with a VPLMN listed in the records, the UE 205 selects 425 an ePDG this VPLMN (depicted here as VPLMN-a 240). However, if the UE 205 is registered via 3GPP access to a VPLMN that is not included in the list of received records (e.g., due to the registered PLMN not deploying a ePDG), then the UE 205 selects 430 an ePDG in one of the PLMNs included in the list of received records.

Specifically, the UE 205 selects a PLMN based on the prioritized list of elements in the ePDG selection information. The UE 205 compares the list of received records to the ePDG selection information and selects the highest priority PLMN matching both the ePDG selection information and the list of received records. As an example, the UE 205 selects an ePDG in the VPLMN-c 260, if the VPLMN-c 260 is the highest priority PLMN in the ePDG selection information and is also included in the list of received records. However, if the ePDG selection information does not match any of the PLMNs in the list of received records, then the UE 205 may be configured (by any kind of implementation means) to select a PLMN included in the list of received records, such as selecting an ePDG in the VPLMN-b 250. In one example, the ePDG selection information does not contain any PLMN included in the list of received records because the HPLMN 215 does not have a roaming agreement with any PLMN in the list of received records. In such situations, the UE 205 may be unable to establish an IPsec tunnel with an ePDG in any of the PLMNs in the list of received records. Accordingly, the UE 205 terminates ePDG selection.

In response to the UE 205 not being registered via 3GPP access to a VPLMN, then the UE 205 selects 430 an ePDG in one of the PLMNs included the list of received records. As an example, the UE 205 may select an ePDG in the VPLMN-c 260. As discussed above, the UE 205 may compare the list of received records to the ePDG selection information and select the highest priority PLMN matching both the ePDG selection information and the list of received records. If the ePDG selection information does not match any of the PLMNs in the list of received records, then the UE may attempt to select a PLMN included in the list of received records. As an example, the UE 205 may attempt to select an ePDG in the VPLMN-b 250. If the attempt fails and the UE cannot select an ePDG in any of the PLMNs in the list of received records, then the UE terminates the ePDG selection procedure. As discussed above, selecting an ePDG may require the UE 205 to send an additional (conventional) DNS query to the DNS server 270 to discover an IP address of the ePDG.

Note that in the embodiments of FIG. 4, the UE 205 does not select an ePDG in the HPLMN 215. This is because local regulations in the visited region 230 mandate ePDG selection in a PLMN located in the visited region 230, for example to support lawful interception. Therefore, in these circumstances selection of an ePDG in the HPLMN 215 is forbidden. As discussed above with reference to FIG. 3, where there are no local regulations mandating ePDG selection in the visited region 230, the UE 205 may select an ePDG in the home region 210 if is not already registered via 3GPP access to a VPLMN included in the ePDG selection information. Specifically, if the UE 205 is already registered via 3GPP access to a VPLMN included in the ePDG selection information, the UE first attempts to select an ePDG in this VPLMN. If this attempt fails, the UE may then select an ePDG in the HPLMN 215.

Figure 5:
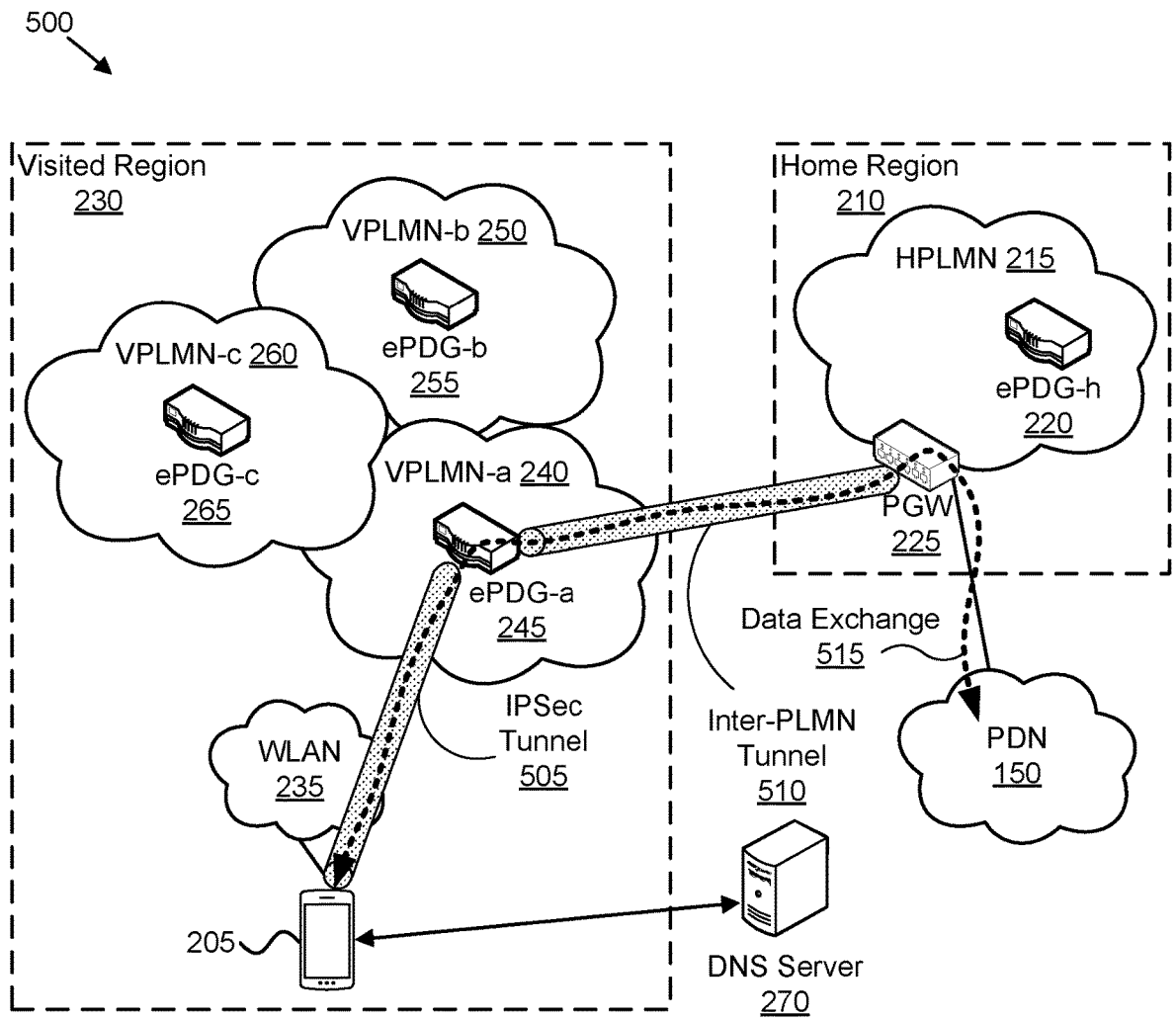
FIG. 5 illustrates the network architecture of FIG. 2 after ePDG selection.

FIG. 5 depicts the network architecture 200 after the UE 205 with WLAN access establishing a PDN connection with an ePDG in order to access the PDN 150. As depicted, the UE 205 selects the ePDG-a 245 located in the VPLMN-a 240 after executing the ePDG selection procedure discussed above with reference to FIG. 3 and FIG. 4. In one embodiment, this is due to the visited region 230 mandating ePDG selection in that region in order to support lawful interception. As discussed above with reference to FIG. 4, the UE 205 may receive a list of one or more records (e.g., one or more PTR records) from the DNS server 270, the list of records identifying at least the VPLMN-a 240. Further, the UE 205 may be provisioned with ePDG selection information, wherein the VPLMN-a 240 matches both the list of records and the ePDG selection information.

Having selected the VPLMN-a 240, the UE 205 discovers the IP address of the ePDG-a 245 by conducting another DNS query (for example, as specified in 3GPP TS 23.402). After discovering the IP address of the ePDG-a 245, the UE 205 establishes a secure IPsec tunnel 505 with the ePDG-a 245 via the connected WLAN 235. The UE 205 then provides the desired access point name ("APN"). The ePDG-a 245 uses the APN to select and connect with a PGW that provides access to services that correspond to the APN. Here, the ePDG-a 245 selects the PGW 225 and connects with it using an inter-PLMN tunnel 510 (e.g. a GTP or PMIP tunnel), after which the UE 205 can exchange data 515 with the PDN 150 via WLAN access.

Figure 6:
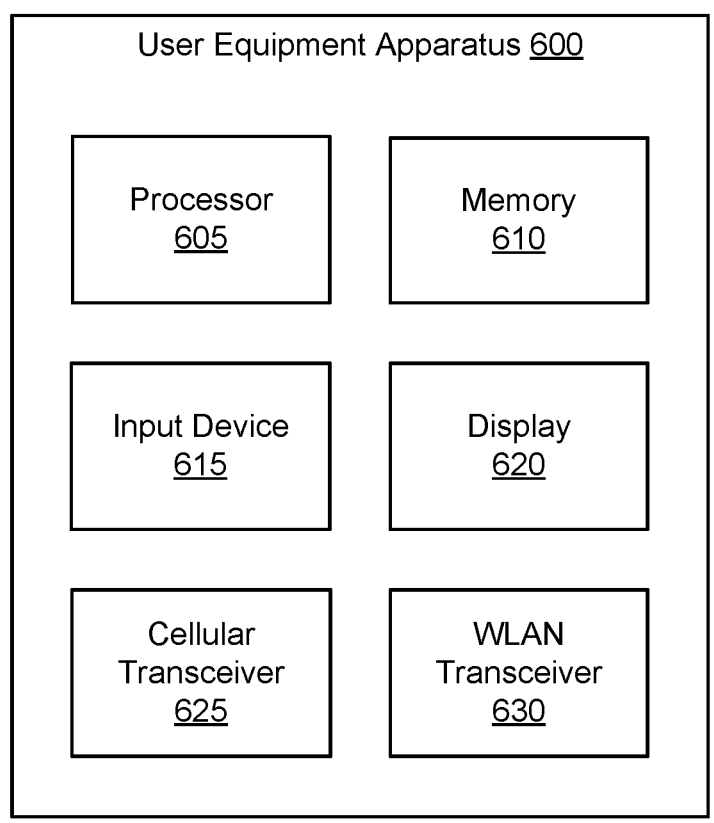
FIG. 6 is a schematic block diagram illustrating one embodiment of an apparatus that may be used for gateway selection.

FIG. 6 depicts one embodiment of an apparatus 600 that may be used for gateway selection. The apparatus 600 includes one embodiment of the remote unit 105. Furthermore, the remote unit 105 may include a processor 605, a memory 610, an input device 615, a display 620, a cellular radio transceiver 625, and a WLAN radio transceiver 630. In some embodiments, the input device 615 and the display 620 are combined into a single device, such as a touchscreen. In certain embodiments, the remote unit 105 may not include any input device 615 and/or display 620.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the display 620, the cellular radio transceiver 625, and the WLAN radio transceiver 630.

In certain embodiments, the processor 605 may identify a region in which the remote unit 105 is currently located (e.g., a present region as described above with reference to FIGS. 3-4). In response to the present region being a home region of the remote unit 105, the processor 605 selects an ePDG in the HPLMN of the remote unit 105. Otherwise, in response to the present region not being a home region of the remote unit 105, the processor 605 may generate and control the WLAN radio transceiver 630 to transmit a query (e.g., a service discovery query) to a DNS server, the query identifying the present region. Based on a response to the query, the processor 605 may then select an ePDG either in a VPLMN in the present region or in the HPLMN as discussed above with reference to FIG. 3 and FIG. 4.

In one embodiment, the DNS server returns no records in response to the query. For example, the DNS server may return an empty response. In such embodiments, the processor 605 may consult ePDG selection information stored in the memory 610 to select an ePDG located in the highest priority VPLMN both listed in the ePDG selection information and located in the present region. In certain embodiments, the processor 605 may determine whether the remote unit 105 is currently registered with a particular VPLMN included in the ePDG selection information and select an ePDG in the particular VPLMN when the remote unit 105 is currently registered with the particular VPLMN. Otherwise, if the remote unit 105 is not currently registered with the VPLMN included in the ePDG selection information, then the processor 605 may select an ePDG in another VPLMN included in the ePDG section information, or may select an ePDG in a HPLMN of the remote unit 105, as discussed above with reference to FIG. 3.

In another embodiment, the DNS server may return a list of one or more records (e.g., PTR records) in response to the query. In such embodiments, if the remote unit 105 is already registered via 3GPP access to a VPLMN and this VPLMN is included in the list of records, the processor 605 selects an ePDG located in this VPLMN. If the remote unit 105 is already registered via 3GPP access to a VPLMN but this VPLMN is not included in the list of records, the processor 605 may select an ePDG located in a VPLMN common to both the list of records and ePDG selection information provisioned by the HPLMN. The processor 605 may select a highest priority VPLMN matching both the list of records and the ePDG selection information.

In some embodiments, there may be no VPLMN common to both the list of records (e.g., PTR records) and the ePDG selection information. For example, the ePDG selection information stored in the memory 610 may be out-of-date. As another example, the ePDG selection information may be incomplete and/or may not include all VPLMNs that the remote unit 105 is permitted to use. In such a scenario, the ePDG selection information may not include any VPLMN in the identified region. If there is no VPLMN common to both the list of records and ePDG selection information, the processor 605 selects an ePDG in one of the VPLMNs in the list of records by using its own implementation means. If the processor 605 cannot establish a connection with any ePDG in the VPLMNs in the list of records (e.g., failing to connect to an ePDG after attempting to establish a connection with every ePDG in in every VPLMN identified in the list of records), then it terminates the ePDG selection procedure.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to ePDG selection, for example ePDG selection information. In some embodiments, the memory 610 also stores program code and related data, such as an operating system or other controller algorithms operating on the remote unit 105.

The input device 615, in one embodiment, may include any known computer input device including a touch panel, a button, a keyboard, a stylus, a microphone, or the like. In some embodiments, the input device 615 may be integrated with the display 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The display 620, in one embodiment, may include any known electronically controllable display or display device. The display 620 may be designed to output visual, audible, and/or haptic signals. In some embodiments, the display 620 includes an electronic display capable of outputting visual data to a user. For example, the display 620 may include, but is not limited to, an LCD display, an LED display, an OLED display, a projector, or similar display device capable of outputting images, text, or the like to a user. As another, non-limiting, example, the display 620 may include a wearable display such as a smart watch, smart glasses, a heads-up display, or the like. Further, the display 620 may be a component of a smart phone, a personal digital assistant, a television, a table computer, a notebook (laptop) computer, a personal computer, a vehicle dashboard, or the like.

In certain embodiments, the display 620 includes one or more speakers for producing sound. For example, the display 620 may produce an audible alert or notification (e.g., a beep or chime). In some embodiments, the display 620 includes one or more haptic devices for producing vibrations, motion, or other haptic feedback. In some embodiments, all or portions of the display 620 may be integrated with the input device 615. For example, the input device 615 and display 620 may form a touchscreen or similar touch-sensitive display. In other embodiments, the display 620 may be located near the input device 615.

The cellular radio transceiver 625 communicates with a mobile communication network (e.g., a PLMN). In some embodiments, the mobile communication network comprises the cellular base units 120 and a mobile core network 130 discussed above with reference to FIG. 1. The cellular radio transceiver 625 comprises a transmitter used to provide UL communication signals to the cellular base unit 120 and a receiver used to receive DL communication signals from the cellular base unit 120.

The WLAN radio transceiver 630 communicates with a WLAN access point, such as the WLAN AP 110 discussed above with reference to FIG. 1. The WLAN radio transceiver 630 comprises a transmitter used to provide UL communication signals to the WLAN AP 110 and a receiver used to receive DL communication signals from the WLAN AP 110.

Figure 7:
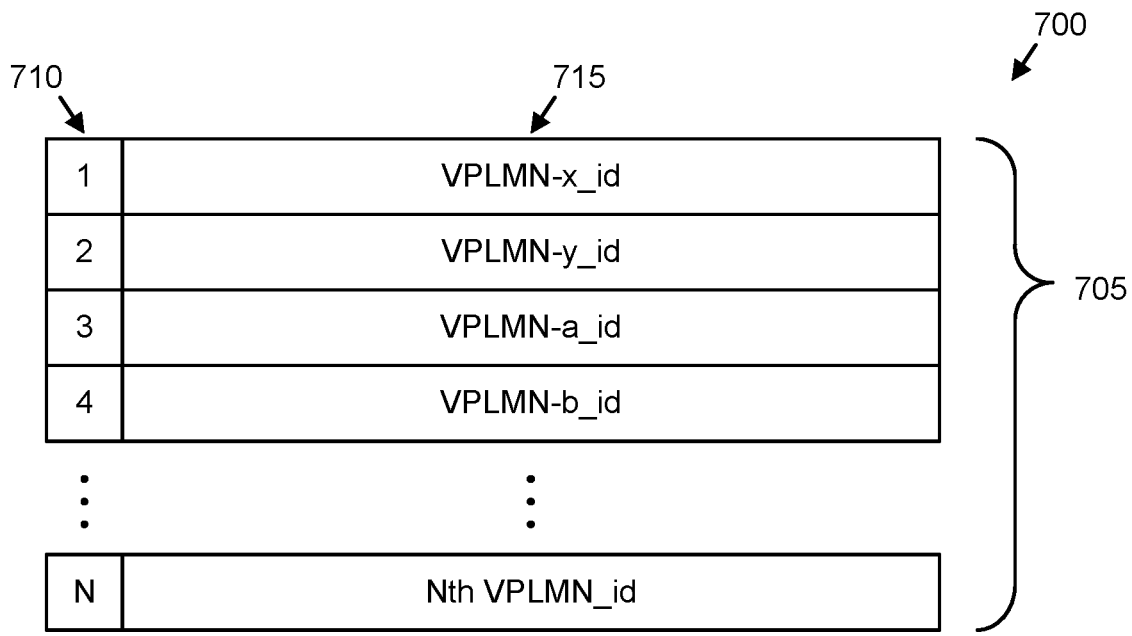
FIG. 7 is a block diagram illustrating one embodiment of ePDG selection information.

FIG. 7 is a block diagram illustrating ePDG selection information 700, according to embodiments of the disclosure. The ePDG selection information 700 includes a list 705 of one or more prioritized PLMNs for gateway selection. Each entry in the list 705 includes a priority value 710 and a PLMN identification 715. In some embodiments, each entry in the list 705 may also include either a tracking/location area identity FQDN or an operator identifier FQDN.

As depicted, the ePDG selection information 700 includes N VPLMN entries, including the VPLMN-x, VPLMN-y, VPLMN-a, VPLMN-b, and Nth VPLMN. Each of the N VPLMNs is assigned a priority value; such that a UE (e.g., the UE 205) will first attempt to connect with an ePDG in the highest priority VPLMN located in the current region or, where ePDG selection is mandated, a highest priority VPLMN in the ePDG selection information 700 that matches the returned records, as discussed above with reference to FIGS. 2-5. Each VPLMN in the ePDG selection information 700 is identified using a PLMN identification 715 unique to that VPLMN. FIG. 7 denotes the PLMN identifications 715 are as "VPLMN-x_id," VPLMN-y_id," VPLMN-a_id," VPLMN-b_id," and Nth VPLMN_id," respectively. In one embodiment, each PLMN identification 715 corresponds to a MCC/MNC tuple uniquely identifying the PLMN.

In some embodiments, the ePDG selection information 700 may include an entry for the HPLMN of a remote unit 105, such as the UE 205 described herein. In such embodiments, the HPLMN has the highest priority (depicted by the lowest priority value 710). In one embodiment, the PLMN identification 715 corresponding to the HPLMN (e.g., "HPLMN id") is an MCC/MNC tuple uniquely identifying the HPLMN.

Figure 8A:
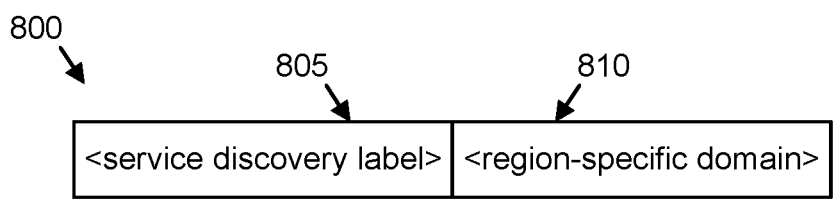
FIG. 8A is a block diagram illustrating one embodiment of a DNS query for gateway selection.
Figure 8B:
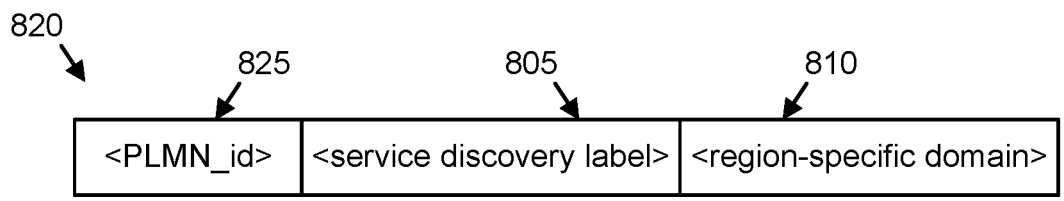
FIG. 8B is a block diagram illustrating one embodiment of a returned record for gateway selection.

FIGS. 8A-8B are block diagrams illustrating a DNS query 800 used for gateway selection and a returned record 820 used for gateway selection, according to embodiments of the disclosure. FIG. 8A depicts a DNS query 800 (such as a PTR query) that includes a service discovery label 805 and a region-specific domain 810. The service discovery label 805 and the region-specific domain 810 may be separated by a period mark ("."). The service discovery label 805 identifies a service the UE wants to discover, such as whether the present region mandates selection of ePDG in that region. In one embodiment, the service discovery label 805 corresponds to the "_epdg._udp" label.

The region-specific domain 810 identifies the domain (e.g., the region) in which the service (ePDG selection discovery) is to be discovered. Here, the region-specific domain 810 identifies the present region, for example using the ISO country code. In one embodiment, the region-specific domain 810 has the format of "isocc<XY>.pub.3gppnetwork.org," where "<XY>" is the ISO code of the country where the UE is located (e.g., the present region), with a period mark (".") separating the service discovery label from the region-specific domain. In a first example, the present region is France and the corresponding region-specific domain 810 is "isoccFR.pub.3gppnetwork.org." In this example, the DNS query 800 would be the string "_epdg._udp.isoccFR.pub.3gppnetwork.org." In a second example, the present region is Germany and the corresponding region-specific domain 810 is "isoccDE.pub.3gppnetwork.org." In this example, the DNS query 800 would be the string "_epdg.udp.isoccDE.pub.3gppnetwork.org."

FIG. 8B depicts a returned record 820 received in response to a DNS query having the form described above with reference to FIG. 8A. Where the DNS query is a PTR query, the returned record 820 is a PTR record. The returned record 820 includes the same service discovery label 805 and region-specific domain 810 as the DNS query 800 that prompted the response containing the returned record 820. The returned record 820 also includes a service instance name 825 ahead of the service discovery label 805, as depicted. Thus, when a DNS server returns one or more records 820 in response to DNS query 800, each record will have the depicted form of a service instance name, a service discovery label, and a region-specific domain with a period mark (".") separating the service instance name from the service discovery label and separating the service discovery label from the region-specific domain.

In one embodiment, the service instance name 825 has the format of "mnc<ABC>_mcc<DEF>" where "<ABC>" and "<DEF>" are three digit MNC and MCC values, respectively, of a PLMN in the region identified in the DNS query 800 (e.g., identified using the region-specific domain 810) which deploy one or more ePDGs. In a first example, the present region is France and the DNS query 800 (e.g., "_epdg._udp.isoccFR.pub.3gppnetwork.org") returns two records: "mnc123_mcc208._epdg._udp.isoccFR.pub.3gppnetwork.org" and "mnc456 mcc208._epdg._udp.isoccFR.pub.3gppnetwork.org." A remote unit 105 receiving these two records thus determines that ePDG selection is mandated in the present region (France) and that an ePDG should be selected either in a PLMN with (MCC=208, MNC=123) or in a PLMN with (MCC=208, MNC=456).

Figure 9:
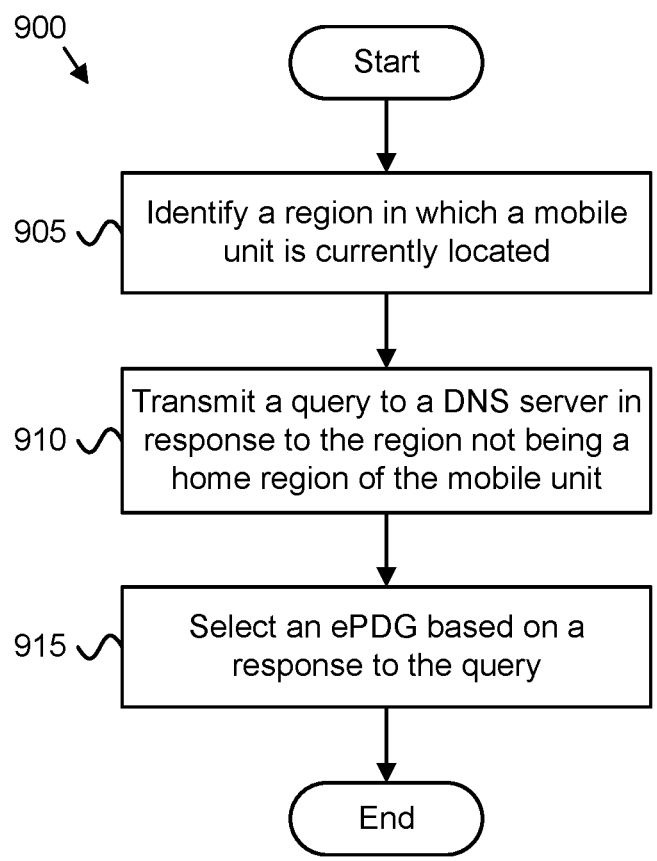
FIG. 9 is a schematic flow chart diagram illustrating one embodiment of a method for gateway selection.

FIG. 9 is a schematic flow chart diagram illustrating one embodiment of a method 900 for gateway selection. In some embodiments, the method 900 is performed by an apparatus, such as the remote unit 105 or UE 205. In certain embodiments, the method 900 may be performed by a processor executing program code, for example, a microcontroller, a microprocessor, a CPU, a GPU, an auxiliary processing unit, a FPGA, or the like.

The method 900 begins and identifies 905 a region in which a remote unit is currently located. In one embodiment, identifying 905 the region includes receiving the Country IE or MCC code broadcast by a WLAN AP or a PLMN, respectively. In another embodiment, identifying 905 the region includes identifying latitude and longitude coordinates (e.g., using a GPS receiver) and making an API call (e.g., using Geocoder( ) in Android™ operating system) to determine the region. The present region may be a country, a state, a jurisdiction, or other region.

The method 900 includes transmitting 910 a query to a DNS server based on the region not being a home region of the remote unit. In one embodiment, the query is a PTR query addressed to a region-specific domain corresponding to the region in which the remote unit is currently located.

In certain embodiments, the PTR query has a format corresponding to that described with reference to FIG. 8A.

The method 900 includes selecting 915 an ePDG based on a response to the query. In some embodiments, the response contains no records (e.g., an empty response). In other embodiments, the response contains a list of one or more records (e.g., PTR records), each record indicating a VPLMN in the identified region. In certain embodiments, each returned record has a format corresponding to that described with reference to FIG. 8B.

Where the response is empty, the remote unit determines that ePDG selection in the identified region is not mandated. Here, selecting 915 the ePDG may include selecting an ePDG in the HPLMN. However, where the response is nonempty (it is a list of one or more records), the remote unit determines that ePDG selection is mandated in the identified region and that the remote unit must select 915 an ePDG in one of the VPLMNs included in the nonempty response. The method 900 ends.

Figure 10:
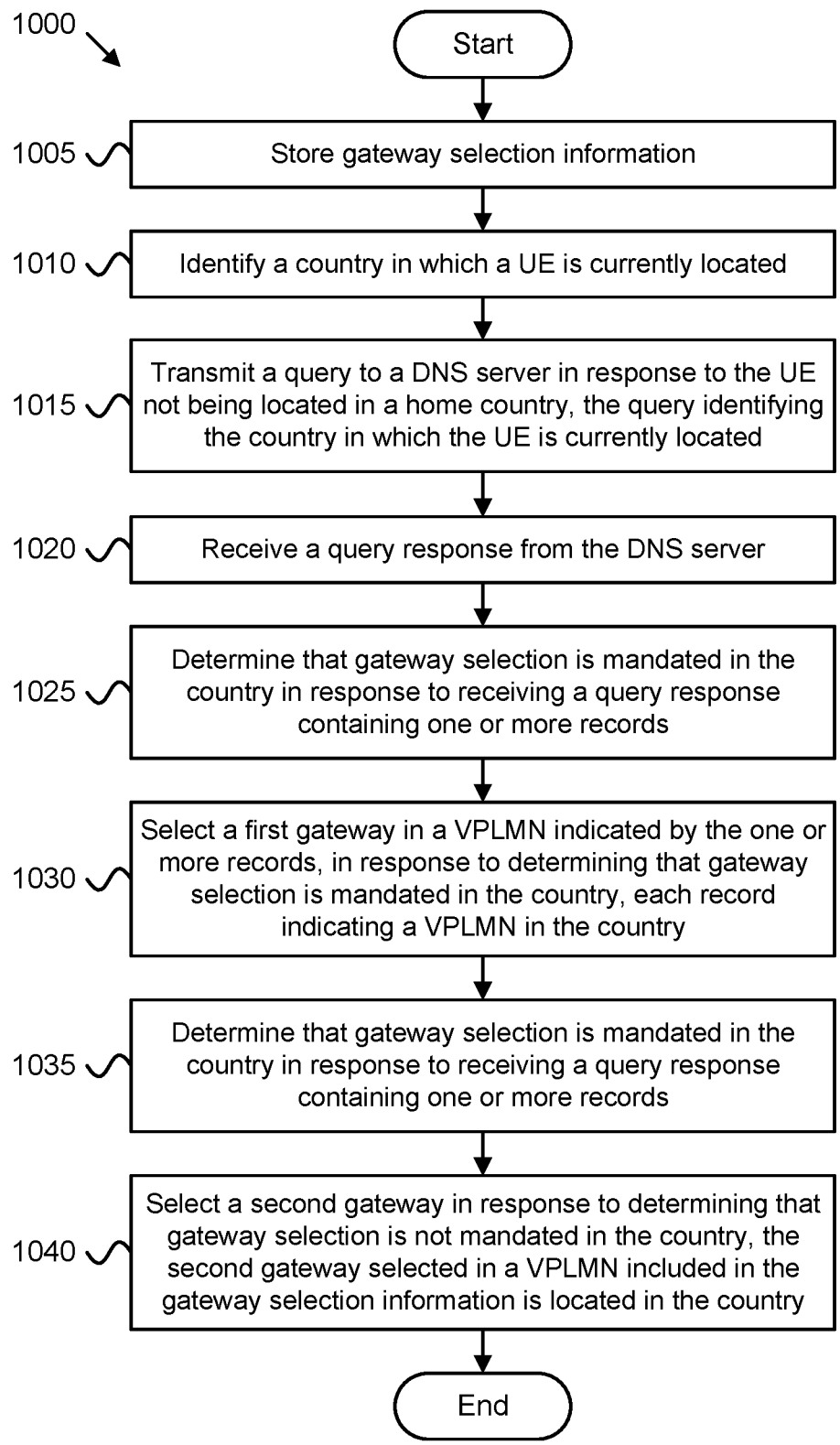
FIG. 10 is a flow chart diagram illustrating another embodiment of a method for gateway selection.

FIG. 10 is a schematic flow chart diagram illustrating one embodiment of a method 1000 for gateway selection. In some embodiments, the method 1000 is performed by an apparatus, such as the remote unit 105 or UE 205. In certain embodiments, the method 1000 may be performed by a processor executing program code, for example, a microcontroller, a microprocessor, a CPU, a GPU, an auxiliary processing unit, a FPGA, or the like.

The method 1000 begins and stores 1005 gateway selection information. The method 1000 includes identifying 1010 a country in which a UE is currently located. The method 1000 includes transmitting 1015 a query to a DNS server in response to the UE not being located in a home country, the query identifying the country in which the UE is currently located. The method 1000 includes receiving 1020 a query response from the DNS server.

The method 1000 includes determining 1025 that gateway selection is mandated in the country in response to receiving a query response containing one or more records. The method 1000 includes selecting 1030 a first gateway in a visited public land mobile network ("VPLMN") indicated by the one or more records, in response to determining that gateway selection is mandated in the country, each record indicating a VPLMN in the country.

The method 1000 includes determining 1035 that gateway selection is not mandated in the country responsive to the query response containing no records. The method 1000 includes selecting 1040 a second gateway in response to determining that gateway selection is not mandated in the country, the second gateway selected in a VPLMN included in the gateway selection information. The method 1000 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a transceiver that communicates with a mobile communication network over a wireless local area network ("WLAN");
a storage device having gateway selection information stored therein; and
a processor that:
identifies a country in which the apparatus is currently located;
transmits a query to a domain name system ("DNS") server in response to the apparatus not being located in a home country, the query identifying the country in which the apparatus is currently located;
receives a query response from the DNS server;
determines that gateway selection is mandated in the country in response to receiving a query response containing at least one record;
selects a first gateway in a visited public land mobile network ("VPLMN") indicated by the at least one record, in response to determining that gateway selection is mandated in the country, each record indicating a VPLMN in the country;
determines that gateway selection is not mandated in the country responsive to the query response containing no records; and
selects a second gateway in response to determining that gateway selection is not mandated in the country, the second gateway selected in a VPLMN included in the gateway selection information.

2. The apparatus of claim 1, wherein selecting the first gateway comprises:
determining whether the apparatus is currently registered with a particular VPLMN indicated by the at least one record, in response to determining that gateway selection is mandated in the country, each record indicating a VPLMN in the country;
selecting a gateway in a VPLMN, in response to the apparatus being currently registered with the particular VPLMN;
determining whether there is a VPLMN indicated by the at least one record that is also included in the gateway selection information stored on the storage device, in response to the apparatus not being currently registered with a particular VPLMN indicated by the at least one record, the gateway selection information comprising at least one prioritized VPLMN;
selecting a gateway located in a highest priority VPLMN common to both the at least one record and the gateway selection information, in response to a VPLMN being common to both the at least one record and the gateway selection information; and
selecting a gateway located in a VPLMN indicated by the at least one record, in response to determining that gateway selection is mandated in the country and in response to no VPLMN being common to both the at least one record and the gateway selection information.

3. The apparatus of claim 1, wherein selecting the second gateway comprises:
determining whether the apparatus is currently registered with a specific VPLMN included in the gateway selection information, in response to determining that gateway selection is not mandated in the country;
selecting a gateway in the specific VPLMN, in response to the apparatus being currently registered with the specific VPLMN;
determining whether a VPLMN included in the gateway selection information is located in the country, in response to the apparatus not being currently registered with a specific VPLMN included in the gateway selection information;
selecting a gateway located in a highest priority VPLMN listed in the gateway selection information and located in the country, in response to determining that gateway selection is not mandated and in response to a VPLMN included in the gateway selection information being located in the country; and selecting a gateway in the home public land mobile network ("HPLMN"), in response to determining that gateway selection is not mandated and in response to no VPLMN included in the gateway selection information being located in the country.

4. The apparatus of claim 1, wherein selecting the first gateway comprises the processor terminating the gateway selection in response to being unable to connect to a gateway in any of the VPLMNs in the at least one record.

5. The apparatus of claim 1, wherein the query is a pointer ("PTR") query to the DNS server, the PTR query addressed to a country-specific domain corresponding to the country in which the apparatus is currently located.

6. The apparatus of claim 5, wherein the query response containing at least one record, wherein a format of each record comprises a service instance name uniquely identifying a public land mobile network, a service discovery label, and the country-specific domain.

7. The apparatus of claim 6, wherein each record is formatted with a service instance name, a service discovery label, and a country-specific domain with a period mark (".") separating the service instance name from the service discovery label and separating the service discovery label from the country-specific domain, wherein the service instance name is a combination of a mobile network code and a mobile country code.

8. The apparatus of claim 5, wherein the PTR query is formatted with a service discovery label and a country-specific domain separated by a period mark ("."), wherein the country-specific domain includes a country code corresponding to the country in which the apparatus is currently located.

9. The apparatus of claim 1, wherein the processor selects a gateway in a home public land mobile network ("HPLMN") in response to the country being a home country of the apparatus.

10. The apparatus of claim 1, wherein the processor further receives a query response from the DNS server containing at least one record, the query response indicating that a gateway is to be selected from the identified country.

11. A method comprising:
storing gateway selection information;
identifying a country in which a user equipment device ("UE") is currently located;
transmitting a query to a domain name system ("DNS") server in response to the UE not being located in a home country, the query identifying the country in which the UE is currently located;
receiving a query response from the DNS server;
determining that gateway selection is mandated in the country in response to receiving a query response containing at least one record;
selecting a first gateway in a visited public land mobile network ("VPLMN") indicated by the at least one record, in response to determining that gateway selection is mandated in the country, each record indicating a VPLMN in the country;
determining that gateway selection is not mandated in the country responsive to the query response containing no records; and
selecting a second gateway in response to determining that gateway selection is not mandated in the country, the second gateway selected in a VPLMN included in the gateway selection information.

12. The method of claim 11, wherein selecting the first gateway comprises:
determining whether the UE is currently registered with a particular VPLMN indicated by the at least one record in response to determining that gateway selection is mandated in the country, each record indicating a VPLMN in the country;
selecting a gateway in a VPLMN in response to the UE being currently registered with the particular VPLMN;
determining whether there is a VPLMN indicated by the at least one record that is also included in the gateway selection information stored on the storage device, in response to the UE not being currently registered with a particular VPLMN indicated by the at least one record, the gateway selection information comprising at least one prioritized VPLMN;
selecting a gateway located in a highest priority VPLMN common to both the at least one record and the gateway selection information, in response to a VPLMN being common to both the at least one record and the gateway selection information; and
selecting a gateway located in a VPLMN indicated by the at least one record, in response to determining that gateway selection is mandated in the country and in response to no VPLMN being common to both the at least one record and the gateway selection information.

13. The method of claim 11, wherein selecting the second gateway comprises:
determining whether the UE is currently registered with a specific VPLMN included in the gateway selection information, in response to determining that gateway selection is not mandated in the country;
selecting a gateway in the specific VPLMN, in response to the UE being currently registered with the specific VPLMN;
determining whether a VPLMN included in the gateway selection information is located in the country, in response to the UE not being currently registered with a specific VPLMN included in the gateway selection information;
selecting a gateway located in a highest priority VPLMN listed in the gateway selection information and located in the country, in response to determining that gateway selection is not mandated and in response to a VPLMN included in the gateway selection information being located in the country; and
selecting a gateway in the home public land mobile network ("HPLMN"), in response to determining that gateway selection is not mandated and in response to no VPLMN included in the gateway selection information being located in the country.

14. The method of claim 11, wherein selecting the first gateway comprises terminating the gateway selection in response to being unable to connect to a gateway in any of the VPLMNs in the at least one record.

15. The method of claim 11, wherein the query is a pointer ("PTR") query to the DNS server, the PTR query addressed to a country-specific domain corresponding to the country in which the UE is currently located.

16. The method of claim 15, wherein the query response comprises at least one record, wherein a format of each record comprises a service instance name uniquely identifying a public land mobile network, a service discovery label, and the country-specific domain, the service instance name.

17. The method of claim 16, wherein each record is formatted with a service instance name, a service discovery label, and a country-specific domain with a period mark (".") separating the service instance name from the service discovery label and separating the service discovery label from the country-specific domain, wherein the service instance name is a combination of a mobile network code and a mobile country code.

18. The method of claim 15, wherein the PTR query is formatted with a service discovery label and a country-specific domain separated by a period mark ("."), wherein the country-specific domain includes a country code corresponding to the country in which the UE is currently located.

19. The method of claim 11, further comprising selecting a gateway in a home public land mobile network ("HPLMN") in response to the identified country being a home country of the UE.

20. The method of claim 11, further comprising receiving a query response from the DNS server containing at least one record, the query response indicating that a gateway is to be selected from the identified country.

* * * * *